Oct. 18, 1966    W. L. GARDNER    3,279,902

FLUID TIGHT SEALING OF GLASS FIBER DEVICES

Filed July 11, 1963    2 Sheets-Sheet 1

W. L. Gardner
INVENTOR.

BY Arnold C. Rood
ATTORNEY

Oct. 18, 1966     W. L. GARDNER     3,279,902
FLUID TIGHT SEALING OF GLASS FIBER DEVICES
Filed July 11, 1963     2 Sheets-Sheet 2
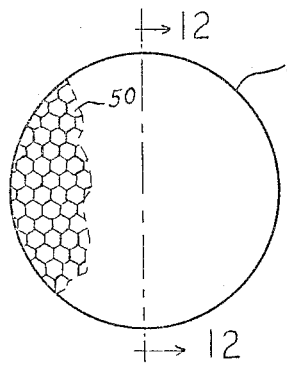
FIG 11
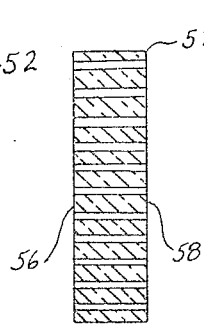
FIG 12
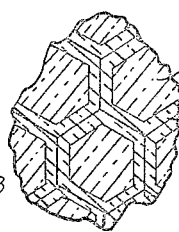
FIG 14
FIG 13
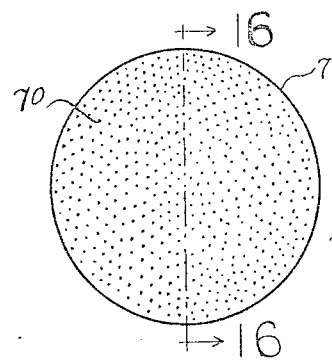
FIG 15
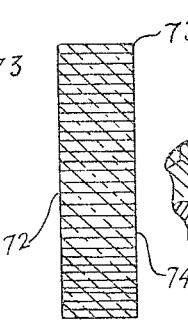
FIG 16
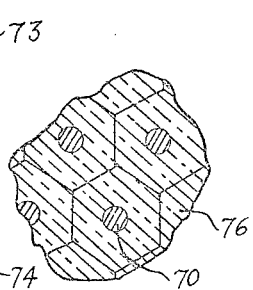
FIG 18
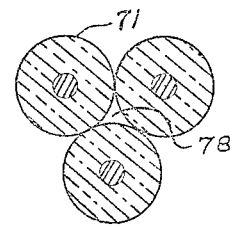
FIG 17
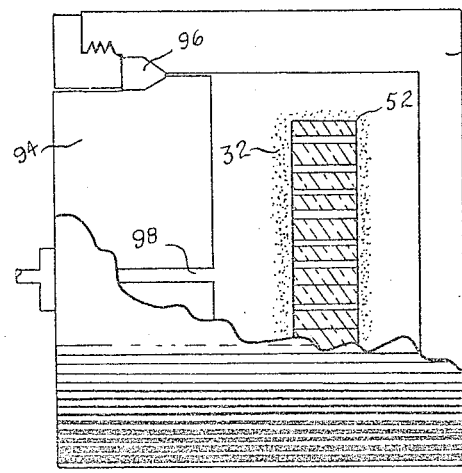
FIG 19
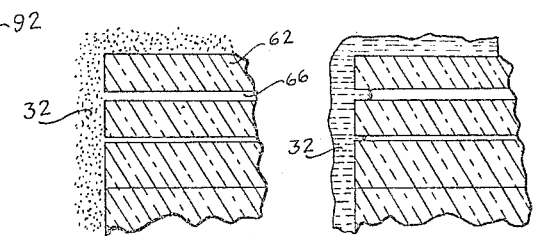
FIG 20     FIG 21
W. L. Gardner
INVENTOR.
BY
Arnold C. Rood
ATTORNEY United States Patent Office 3,279,902
Patented Oct. 18, 1966

3,279,902
FLUID TIGHT SEALING OF GLASS
FIBER DEVICES
William L. Gardner, 80 Great Plain Ave.,
Wellesley, Mass.
Filed July 11, 1963, Ser. No. 294,316
4 Claims. (Cl. 65—4)

This invention relates to glass fibers, and more particularly to the treatment of certain glass fiber structures to provide effective performance thereof.

The glass fibers with which this invention is primarily concerned are of small and precisioned dimension and complex character. Thus, such fibers may comprise glass shells having outside diameters generally of the order of 0.0001 inch to 0.1 inch, and these shells may have cores of optical glass, or of metal, or indeed may be hollow. In the structures in which such fibers are embodied and to which the method of this invention is particularly applicable, the fibers are arranged in generally parallel relation, grouped in bundles, and utilized in scientific instruments. Thus, bundles of glass fibers with cores of optical glass are used to conduct electromagnetic energy, namely light, in the visible range, or in the invisible infra-red or ultra-violet ranges. Bundles composed of fibers with metal cores are employed to conduct electrical charges lengthwise of the fibers. Bundles of hollow fibers are utilized to conduct fluids such as gases.

For technical and scientific purposes, glass fibers in the amount of hundreds of thousands and more, and of selected length, may be arranged in parallel relation and integrally united into bundles by fusion of the shells of the fibers, either directly, or by means of a vitric matrix in which the fibers are embedded. Such bundles may be embodied in various structures, for example faceplates in vacuum tubes and headers or bulkheads for gas diffusion cells. For such applications, gas pressure differentials of substantial amount may exist on opposed sides of the glass fiber structure, and for effective and successful operation, the faceplate or header, for example, must be highly leakproof. It so happens, however, that in the manufacture of such glass fiber structures, a large percentage of the structures are not sufficiently leakproof, and therefore not usable.

In view of the potential loss, many attempts have been made to correct the defects of glass fiber structures with reference to leakproofness. Thus, for example, in the case of faceplates for vacuum tubes, it has been attempted, with indifferent results, to correct leakage problems by various expedients, including coating the faceplate or other glass fiber structure with materials such as grease, epoxy resin, or evaporated films.

The method or process of the present invention makes possible, by way of reclamation or direct production, the formation of glass fiber structures of leakproof character such as to provide an effective barrier when a substantial or high pressure differential exists on opposed sides of said constructions. In one illustrative situation this may represent the difference between a very high gas pressure on one side of a construction and a much lower, such as atmospheric, pressure on the other. In another situation the pressure differential may represent the difference between atmospheric pressure on one side of the construction and a high vacuum on the other.

The method or process of this invention which, as stated, results in leakproofing a glass fiber structure, involves heating such glass fiber structure to a high temperature below its melting point, and subjecting it to high pressure. The heating and subjection to pressure is preferably associated with the prior application to the glass fiber structure of a sealing or filling material which becomes mobile or fluid by reason of the applied heat and pressure, or with the prior application of other covering or enveloping material.

The heat treatment of the glass fiber structure may be expressed in terms of the resulting viscosity of the glass, namely, the fiber glass structure may be heated so that its viscosity moves into the range of $10^9$ to $10^{12}$ poises, in other words, a billion to a trillion poises. Illustratively, temperatures contemplated by this invention may range from about 800° F. to about 1400 F., and pressures upwardly of 10,000 pounds per square inch may be involved. In the treatment of articles such as faceplates the pressure is isostatic, in that the same pressure is applied to all surfaces of the structure, whereby there is no net translational force thereon. The isostatic pressure is applied by subjecting a glass fiber structure to a fluid atmosphere, which for example may be a gaseous atmosphere of an inert gas such as nitrogen, or a liquid or gaseous atmosphere of a substance such as sodium.

The application of principles falling within the scope of the invention makes possible the preparation of modified structures of advantageous character, as well as certain alternatives and modifications in method steps, as will appear hereinafter.

In the accompanying drawings, which are generally diagrammatic in character:

FIG. 11 is a top plan view of a fiber optical faceplate which may be treated by the process of this invention;

FIG. 12 is a transverse section on line 12—12 of FIG. 11;

FIG. 13 is an enlarged transverse sectional view of associated optical fibers of a bundle before merging in accordance with this invention;

FIG. 14 is a view of the fibers of FIG. 13 after merging;

FIG. 15 is a top plan view of an electrically conducting wire mosaic faceplate which may be treated by the process of this invention;

FIG. 16 is a transverse section of line 16—16 of FIG. 15;

FIG. 17 is an enlarged transverse sectional view of associated wire mosaic glass fibers of a bundle before merging;

FIG. 18 is a view of the fibers of FIG. 17 after merging;

FIG. 19 is a side elevational view partly in section of a heat-resistant high pressure vessel showing therein a faceplate to be treated in accordance with the process of this invention;

FIG. 20 is an enlarged fragmentary sectional view of the faceplate shown in FIG. 19; and FIG. 21 is a view similar to FIG. 20 illustrating penetration of the sealing material between the fibers of the faceplate.

Figure 1:
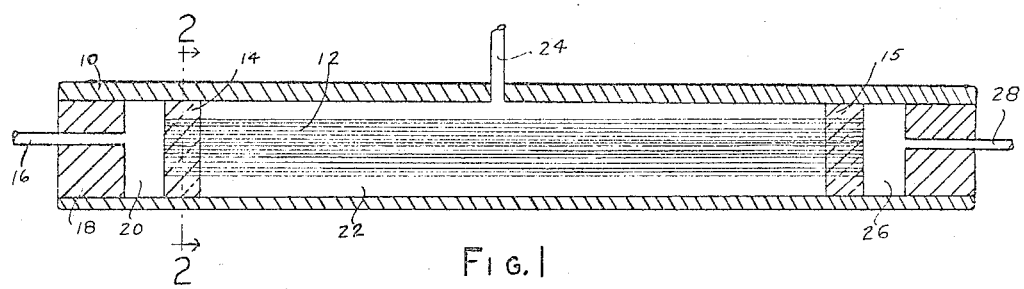
FIGURE 1 is a longitudinal sectional view, diagrammatic in character, of a gaseous diffusion cell with reference to which the method or process of this invention may be practiced.

The method of this invention is applicable to a variety of situations, as illustrated, for example, by the gaseous diffusion cell in FIG. 1, the fiber optical faceplate in FIG. 11, and the wire mosaic faceplate in FIG. 15.

As has been brought out hereinbefore, high heat and pressure are required for the practice of the process of the invention. In FIG. 1 the casing itself of a gaseous diffusion cell is shown as employed as a heat-resistive high pressure vessel, and the headers are integrally and permanently united to the inner walls of the casing or vessel. In FIG. 19, on the other hand, the walls of the heat-resistive, high pressure vessel are out of contact with the articles treated therein, and the articles are removed from the vessel following treatment in accordance with the invention.

FIG. 1 illustrates the application of the method of this invention to the leakproofing of headers of a gaseous diffusion cell wherein, in normal operation, a gas enters one end of the cell, and passes through glass tubes and out of the other end of the cell. Meanwhile, a constituent, for example helium, to be recovered from gas, diffuses through the walls of the tubes, and is collected from an exit passage disposed centrally of the cell. For the proper functioning of the diffusion cell, the headers must be leakproof with reference to the gases being treated therein, and for relatively low temperature operation, certain resins of the potting type, for example epoxy resins, have been employed as headers within the casing. The diffusion operation may be carried out much more rapidly and efficiently at high temperatures, for example in the neighborhood of 800° F., but at such high temperatures headers and sealing materials of the resinous type fail and gas leakage results, to the detriment of the diffusion operation. The present invention makes possible efficient high temperature operation by permitting the use of glass headers and providing a method of leakproofing such glass headers.

In the specific embodiment illustrated in FIG. 1, a high temperature metal alloy enclosure 10 is illustrated in longitudinal sectional view, and comprises a circular cylindrical tube of a strong alloy steel. Cylindrical vessel 10 may have, by way of example, an inner diameter of about ¼ and outer diameter of about ½ inch.

Assembled within cylindrical vessel 10 are a plurality of long small tubes of glass. These tubes 12 are constructed of glasses which are preferentially permeable to certain gases.

The glass tubes 12 of FIG. 1 may have, by way of specific example, internal diameters of 0.00016 inch and external diameters of 0.0002 inch, and length of 12 inches and in quantity may total 50,000.

The glass tubes 12 are open at both ends and are mounted in glass headers 14 and 15 at both ends. In accordance with the present invention, the mounting of the tubes 12 into the headers 14 is done in a fluid tight manner such that gas cannot pass through the header 14 in the region between tubes, and also in accordance with this invention the header 14 is sealed tightly to the inner wall of metal tube 10. Gas to be purified enters entrance orifice 16 through a metal end plug 18 into region 20. From region 20 the gas, under pressure, passes through header 14 into the tubes 12. Certain constituents of the gas (helium, for example) diffuse through the glass walls of these tubes 12 into the region 22 which is maintained at lower pressure by removal of the diffused gases through exit orifice 24. Gas remaining in the tubes 12, depleted of the permeable gas, continues along the tubes, passes through the exit header 15 into region 26. The depleted gas is then exhausted through exit orifice 28.

As a result of the method steps of the present invention the entire structure of FIG. 1 is capable of operation at elevated temperatures and pressures. Inasmuch as gaseous separation by diffusion is significantly enhanced by operation at elevated temperatures (temperatures ranging from 400° F. to 1300° F.) and pressures (up to 1000 atmospheres), a cell constructed according to the method of this invention, hereinafter described in further detail, is highly advantageous. A critical procedure in the construction of these gas diffusion cells is the fluid tight sealing of the small glass tubes 12 into header 14 and the fluid tight sealing of the header 14 into the metal tube 10. These structures are shown in enlarged fragmentary cross section in FIG. 2. Since as many as 50,000 tubes are sealed into a header about ¼ inch in diameter the requirement that this header be leaktight is very critical.

Figure 2:
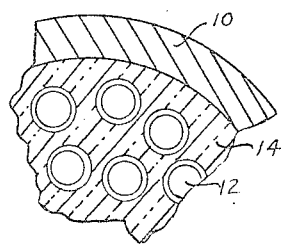
FIG. 2 is an enlarged fragmentary cross-sectional view taken on line 2—2 of FIG. 1.
Figure 3:
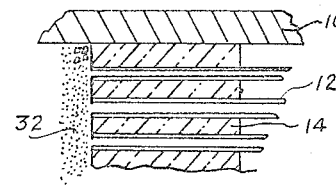
FIG. 3 is an enlarged fragmentary longitudinal sectional view of the header adjacent to the line 2—2 of FIG. 1, with sealing compound in frit form indicated on the outer surface of the header.

In one aspect of the method of this invention, the steps of which are illustrated in FIGURES 2, 3, 4, and 5, a glass frit, or ground up glass powder is used. FIG. 2 shows the initial tube and header arrangement which has been roughly formed and may have few or many leaks. FIG. 3 is a fragmentary longitudinal sectional view of the header 14, on which a glass frit 32 is positioned as shown.

A glass, or vitreous, frit, to those skilled in the art, is a general term denoting a glass in powdered form of various formulations and properties. In general, it is a heat softenable sealing compound. It may consist, for example, of glass of the borosilicate glass family, similar to that most generally used in the tubes 12. This might be a formulation of 75 percent by weight of silica, and between 2 and 15 percent $B_2O_3$. Or it might be a low melting glass such as 12% $B_2O_3$ and 88% PbO. Or it might be a commercial glass frit such as Corning No. 7570.

Figure 4:
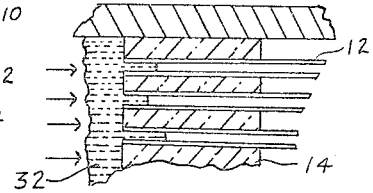
FIGS. 4 and 5 are views similar to FIG. 3 illustrating further steps in the process of this invention.
Figure 5:
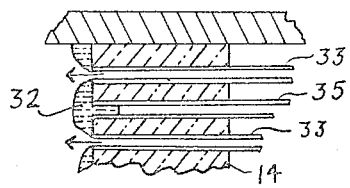

The arrangement shown in FIG. 3 may be subjected to an elevated temperature in the range of 500 to 900 degrees F. so that the powdered glass frit melts or fuses into a glaze of viscosity varying with the temperature of heating. This is illustrated in FIG. 4 with the glass sealing material 32 shown in viscous form. Pressure applied in the direction of the arrows (FIG. 4) is employed to drive the glassy sealing material into crevices, leaks, and even partially into the glass tubes 12. Simultaneously, varying amounts of reverse pressure from the remote open ends of the glass tubes may be applied from orifice 28 (FIG. 1) to limit or regulate the penetration of the sealing material into the glass tubes, thus permitting long periods of extreme high pressure application and making it possible for highly viscous sealing compounds to penetrate and fill even the smallest crevices. As a final step, shown in FIG. 5, a higher pressure is applied from the exit header 15 (FIG. 1) of the cell. This removes the sealing compound from the entrance of the good tubes 33 in header 14 (FIG. 5) but leaky or broken tubes 35 are sealed off in this manner because there is not adequate reverse pressure to remove the sealant.

Figure 6:
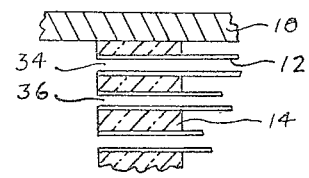
FIGS. 6 and 7 are views similar to FIGS. 3, 4 and 5, and illustrating an alternative manner of carrying out the invention.
Figure 7:
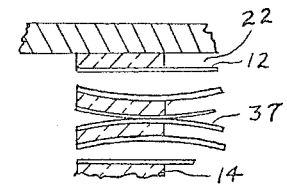

FIGS. 6 and 7 illustrate another aspect of the method of this invention for effecting a fluid tight seal in header 14. The structure is elevated in temperature to a point where the glass tubes become slightly softened, for example, in the vicinity of 800 to 1300 degrees F. Pressure is introduced through header 15. Unbroken tubes will have a small positive pressure as illustrated in FIG. 6, and this pressure, exerted on the inside walls of such tubes 12, causes the tubes to expand. Broken or defective tubes will not exhibit this internal pressure and they will tend to collapse, as illustrated at 37 in FIG. 7. In addition, a vacuum or partial vacuum may be created in region 22 (FIGS. 1 and 7) so as further to reduce the pressure in defective tubes and aid their collapse. The small positive pressure in the unbroken tubes also tends to seal other crevices and leaks in header 14. It may be noted that it is possible to localize the heated area so that only the header 14, or only portions of the header, are softened.

It may be observed that the above-described aspects of the method of this invention may be sequentially applied, first to the entrance header 14, and then to header 15. There may even be special conditions wherein it is desirable to carry out the method again with reference to one or both headers. A severe leak, or crevice, for example, might so drastically affect the pressure equilibrium so as to make repetition of the method steps desirable.

Figure 8:
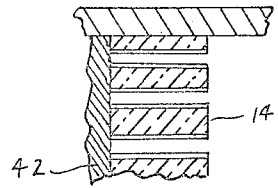
FIGS. 8, 9 and 10 are enlarged fragmentary longitudinal sectional views illustrating the application of the invention to the fabrication of structures embodying electrically conductive glass fibers.
Figure 9:
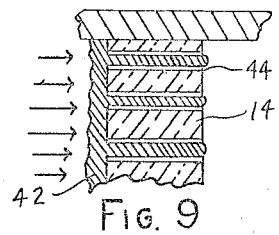
Figure 10:
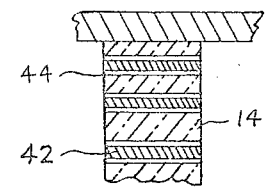

In another aspect the method of this invention may be utilized to fabricate an electrically conductive header or "wire mosaic." In FIG. 8 a metal-containing material or compound 42 is positioned as shown on a header surface in a tube such as shown in FIG. 1. The temperature is raised for example to about 600 to 1000 degrees F., until the metal-containing material softens and becomes mobile. Pressure, for example upwards of 300 pounds per square inch, is then applied to the viscous material 42 in the direction indicated by the arrows in FIG. 9. The material is forced into all holes and crevices including the inside of the tubes. Pressure is maintained for a time for example at least 30 minutes, sufficient to fill the tubes and cause the compound to emerge from the far side of the header or plate 44. The pressure is then removed, and the temperature lowered and the electrically conductive material permitted to solidify. Excess sealing material is then removed mechanically, as by abrasion, from both sides of plate 44, as illustrated in FIG. 10. A fluid tight plate or structure is obtained which has individual, isolated, channels of metal-containing material, which exhibit electrical continuity between the faces of the plate 44. Such a wire mosaic header may be utilized as a faceplate in an electronic vacuum tube. The metal-containing sealing compound may consist, for example, of a glass frit with a metal powder mixed in. By way of specific example, a formulation of 70 percent solder glass frit and 30 percent silver powder is suitable. In addition, certain metal powders such as tin, lead, and zinc, either alone, or as alloy mixtures may be employed.

The leak proofing aspect of the method of this invention has important applications in the field of fiber optics (glass fibers with glass shells and higher refractive index glass cores) and to electrical or wire mosaics (glass fibers with glass shells and electrically conducting cores).

FIG. 11 is a diagrammatic top plan view of a representative fiber optic faceplate. Individual optical fibers 50 are illustrated in fragmentary fashion. A sectional view is shown in FIG. 12. In use, light (electromagnetic radiation) is transmitted from one face 56, separately along each fiber, to the opposite face 58. In normal use such a faceplate is used as an interface of an electronic tube and as such must act as a barrier to the passage of deleterious material, such as liquids and gas particles. FIG. 14 is an enlarged fragmentary view of a fiber optics faceplate. The glass fiber shells 62 of adjacent fibers are shown as merged integrally joined, or fused. The glass core 64 may take the hexagonal shape as shown, or depending on the materials and temperature used, it may remain round. In FIG. 13 is shown an enlarged view of three single glass fibers prior to fusion. The triangular region 66 is a highly critical area in that, as fusion progresses, this region, in theory, becomes vanishingly small, or non-existent. In actual practice, it is extremely difficult to effect complete closure of these crevices especially to the degree required by high vacuum electronic devices.

FIG. 15 is a diagrammatic top plan view of an electrical wire mosaic fiber device 73, such as a face plate. The conductive wires 70 may be positioned regularly, or they may be aligned subject to a slight scattering. In FIG. 16 all of the electrical wires 70 are shown arrayed in isolated parallel relationship so as to convey an electrical current or charge pattern from one face 72 to the opposite face 74. In FIG. 18 the glass fiber shells 76 are shown merged. The electrically conducting cores or wires 70 are usually round, and small in diameter relative to the shell diameter. FIG. 17 portrays three unfused electrically conducting glass single fibers 71. The region 78, the small triangular crevice between the three fibers is a critical area similar to region 66 in FIG. 14. The same requirements apply here, namely, that in processing this and similar crevices (there are as many crevices as there are single fibers and these may number as high as a billion in larger faceplates) must be rendered completely free of leaks, or leaktight.

It will be noted, as shown in FIGS. 14 and 18 that the boundary line between the originally separate shells is a hexagon. When unequally sized fibers are used less orderly arrangements, polygons of four, five, seven or more sides are found. Each angle of such a polygon must be extremely sharp or a crevice or potential leak will exist. To obtain such a sharp angle in the glass shell itself, and thereby eliminate the interfiber interstices, has been a long standing problem in this field.

Accordingly, the difficulty has been to fabricate these fiber optic devices so as to be fluid tight, in view of the fact that they have potentially millions of leak points. While high temperatures are employed in many methods of sealing, too much heating will readily damage fiber optic devices. The heat diffusion and intermingling of the core glass and shell glass will destroy the optical properties of the interface. In addition slight overheating will cause bubbles and blowholes which degrade the optical and electrical properties of these devices. It can be stated then that heat alone is not a practical method for effecting a fluid tight condition in fiber optics devices.

Applicant has found that a novel and effective manner of consolidating these structures and effecting a fluid tight seal is to subject the structure to extremely high pressures while maintaining the glass as cold or as highly viscous as possible. Furthermore the extremely high pressures (up to several thousand atmospheres and more) are most efficaciously applied in an isostatic fashion, for example, by immersion of the structure to be treated in a highly pressurized gas or other fluid, so that there is no net translational force, and therefore a minimum of distortion. It has also been found that a finely divided dry powder or grit acts in the manner of a fluid in that isostatic pressure can be transmitted to a glass fiber structure embedded in it by applying pressure to one or more sides of a vessel containing such a grit. Small quartz spheres, for example, will flow by each other at the temperatures contemplated by this invention.

In as much as glass fiber structures may range in size from fractions of an inch in one or all dimensions up to 12 inch diameter faceplates 1 inch thick a suitable type of processing enclosure is provided to carry out the method of this invention. A high temperature pressure vessel capable of withstanding pressures up to several thousand atmospheres and simultaneously at temperatures up to 1300° F. is employed. A pressure vessel or reactor of 12" inside diameter and 18" inside length containing a pressure of 1000 atmospheres will have a total radial pressure of 10 million pounds. Special stainless steel alloys such as those known commercially as Uniloy 19–9DL may be effectively employed for the purposes of this invention. These are both chrome-nickel steels containing small amounts of other alloying constituents, the former containing usually 13.50–16.00% chromium and 24.00–27.00% nickel, and the latter containing usually 18.00–20.00% chromium and 8.00–11.00% nickel.

FIG. 19 illustrates the practice of the method of the invention in a pressure vessel, composed of heat- and pressure resistant materials as described above. The vessel body 92 has walls of sufficient thickness to withstand forces of the magnitude referred to previously. The cover 94 is removable for insertion of work to be processed. The sealing ring 96 is shaped to permit an outward component of the pressure within the vessel to aid in realizing a good pressure seal at high temperature, while still permitting ready opening of the vessel when pressure and temperature are reduced. An entrance orifice 98 allows the pressurizing medium to enter the vessel.

A normal pressurizing medium would be an inert gas, such as helium, argon nitrogen, etc. although other more general types of fluids, such as liquid sodium, mercury

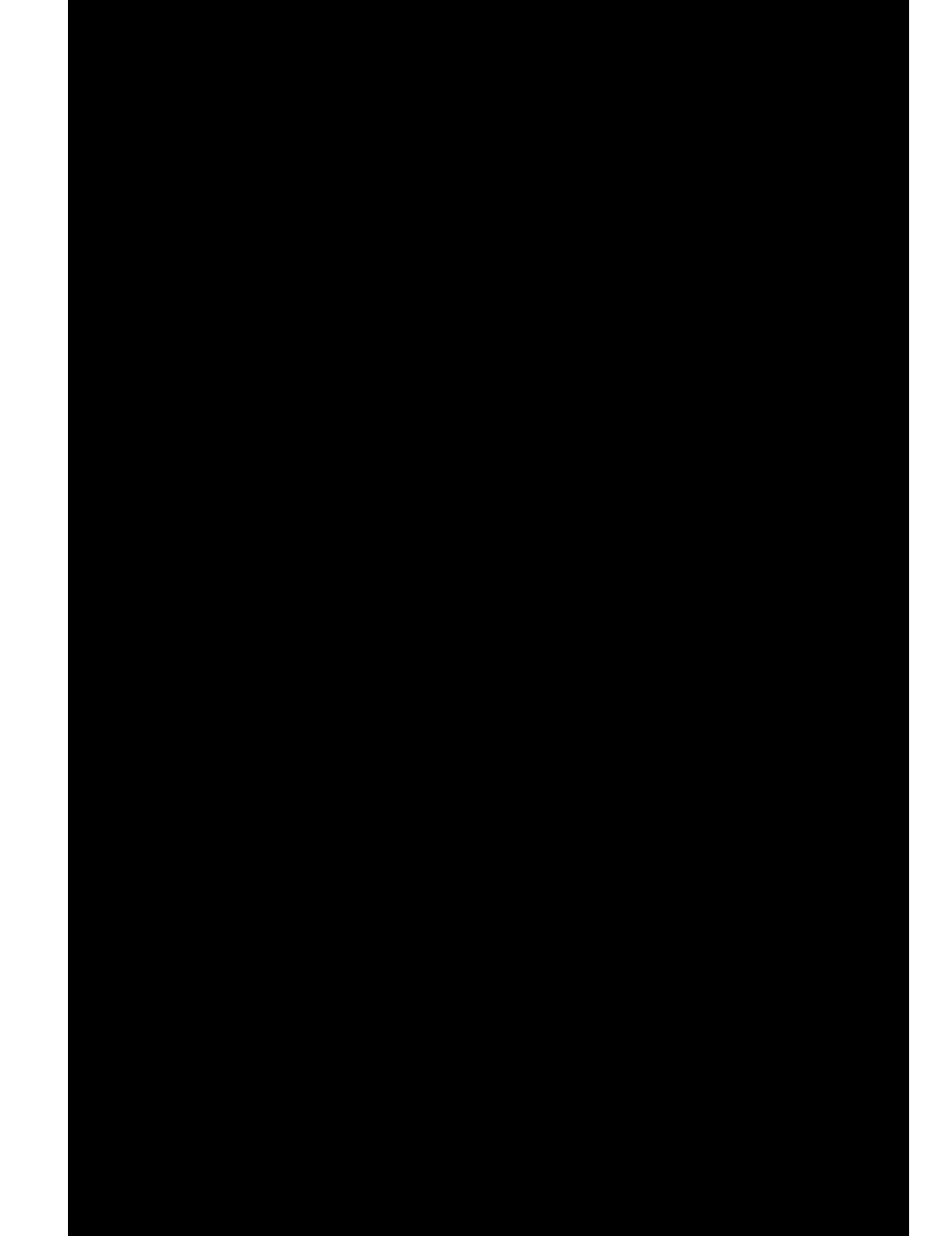

borhood of about 800–1300° F., applying pressure to said heated structure through said fluid medium to upwards of several thousand pounds per square inch, maintaining said pressure for a period of at least about ½ hour, reducing the temperature until the structure has become rigid, and then removing the fluid pressure from the rigid structure.

3. The method of rendering leakproof a header of a structure embodying a bundle of glass fibers having hollow shells which are integrally joined adjacent to their ends into a first header and a second header respectively, said method comprising applying a heat-softenable vitreous frit type sealing compound to the outer end of the first header, heating the structure to a temperature to bring the viscosity of said sealing compound within the range of $10^9$ to $10^{12}$ poises, subjecting the outer end of said first header to a gas pressure of at least about several thousand pounds per square inch, reducing the pressure to normal, subjecting the outer end of said second header to a gas pressure of at least several thousand pounds per square inch, and reducing the gas pressure and temperature to normal.

4. The method of rendering leakproof a header of a structure embodying a bundle of glass fibers having hollow shells which are integrally joined adjacent to their ends into a first header and a second header respectively, said method comprising applying a vitreous frit type sealing compound to the ends of the fibers, heating said structure to bring the viscosity of the glass fibers at said first header within the range of $10^9$ to $10^{12}$ poises and to fluidize the sealing compound, subjecting the outer end of said first header to a gas pressure of at least about several thousand pounds per square inch, reducing the pressure to normal, subjecting the outer end of said second header to a gas pressure of at least about several thousand pounds per square inch, and reducing the pressure and temperature to normal.

References Cited by the Examiner

UNITED STATES PATENTS

| 243,281 | 6/1881 | Maxwell | 65—49 |
| 243,282 | 6/1881 | Maxwell | 65—49 |
| 2,431,632 | 11/1947 | Brandt. | |
| 2,619,438 | 11/1952 | Varian et al. | |
| 2,752,731 | 7/1956 | Altosaar. | |
| 2,992,516 | 7/1961 | Norton. | |
| 3,041,228 | 6/1962 | MacLeod. | |
| 3,050,907 | 8/1962 | Hicks, et al. | 65—4 |
| 3,224,851 | 12/1965 | Hicks | 65—4 |

FOREIGN PATENTS 160,152  12/1921  Great Britain.

DONALL H. SYLVESTER, *Primary Examiner.*

F. W. MIGA, *Assistant Examiner.*